K. A. SIMMON AND S. B. SCHENCK.
SYSTEM OF CONTROL.
APPLICATION FILED SEPT. 15, 1916.

1,330,557.

Patented Feb. 10, 1920.
5 SHEETS—SHEET 1.

WITNESSES:

INVENTORS
Karl A. Simmon
& Samuel B. Schenck
BY
ATTORNEY

K. A. SIMMON AND S. B. SCHENCK.
SYSTEM OF CONTROL.
APPLICATION FILED SEPT. 15, 1916.

1,330,557.

Patented Feb. 10, 1920.
5 SHEETS—SHEET 3.

WITNESSES:
Fred H. Miller
W. R. Coley

INVENTORS
Karl A. Simmon
& Samuel B. Schenck
BY
Wesley E. Carr
ATTORNEY

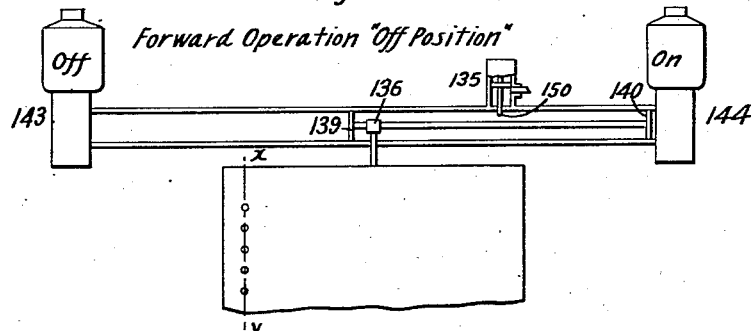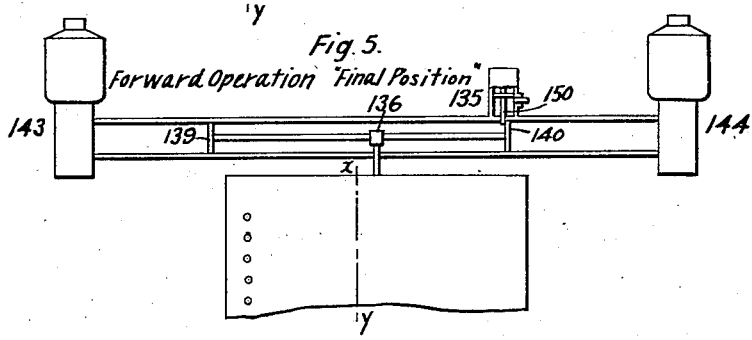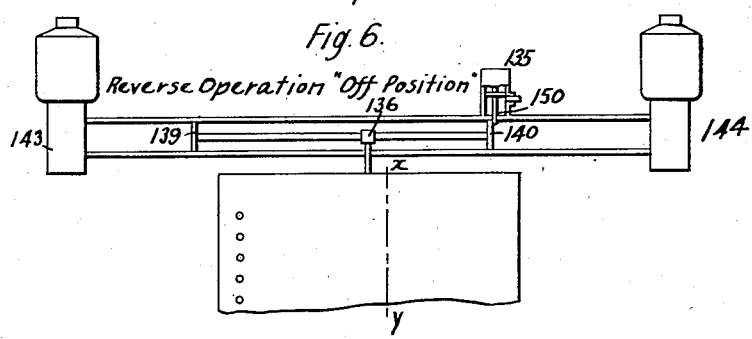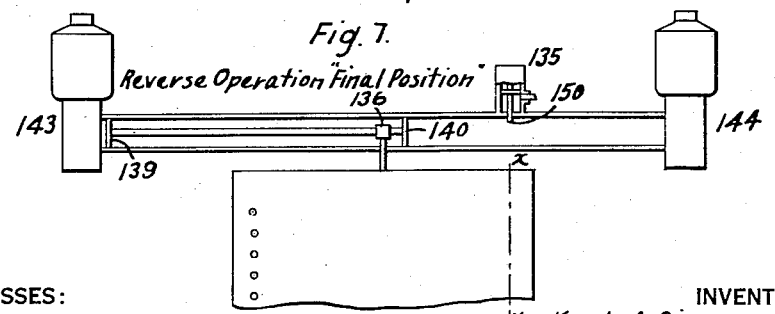

K. A. SIMMON AND S. B. SCHENCK.
SYSTEM OF CONTROL.
APPLICATION FILED SEPT. 15, 1916.

1,330,557.

Patented Feb. 10, 1920.
5 SHEETS—SHEET 5.

WITNESSES:

INVENTORS
Karl A. Simmon
& Samuel B. Schenck
BY
ATTORNEY

UNITED STATES PATENT OFFICE.

KARL A. SIMMON, OF EDGEWOOD PARK, AND SAMUEL B. SCHENCK, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,330,557.　　　　Specification of Letters Patent.　　Patented Feb. 10, 1920.

Application filed September 15, 1916. Serial No. 120,278.

*To all whom it may concern:*

Be it known that we, KARL A. SIMMON, a citizen of the United States, and a resident of Edgewood Park, in the county of Allegheny and State of Pennsylvania, and SAMUEL B. SCHENCK, a citizen of the United States, and a resident of Wilkinsburg, in the county of Allegheny and State of Pennsylvania, have invented a new and useful Improvement in Systems of Control, of which the following is a specification.

Our invention relates to control systems and apparatus for dynamo-electric machines and especially to the control of electric railway motors and the like.

The object of our invention is to provide various actuating mechanisms for a controller or other member that is adapted to employ different portions of its range of travel, for example, to govern the forward or reversed operation of a motor, such actuating mechanisms being biased to predetermined positions by fluid pressure or otherwise, and means for utilizing the fluid-pressure effect, under predetermined conditions, to produce the selected movement of the movable member in a step-by-step manner.

Figure 1:
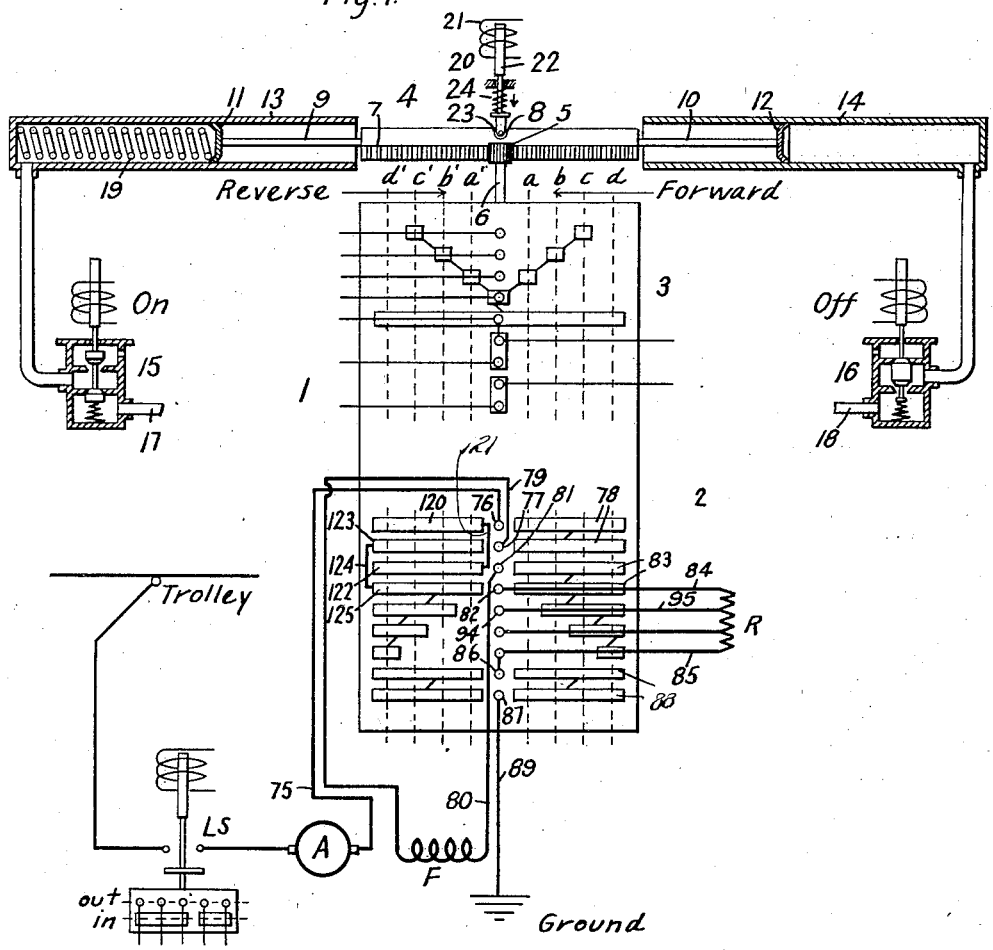
Figure 2:
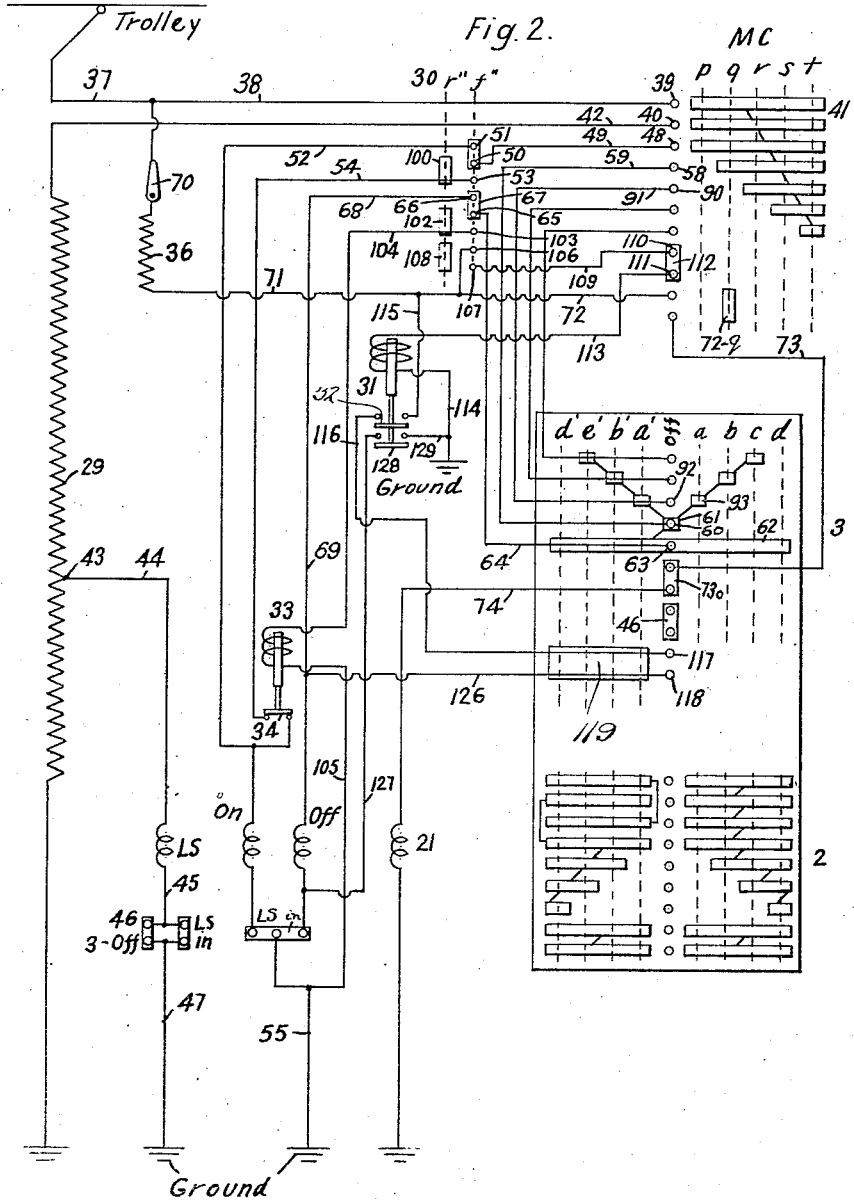
Figure 3:
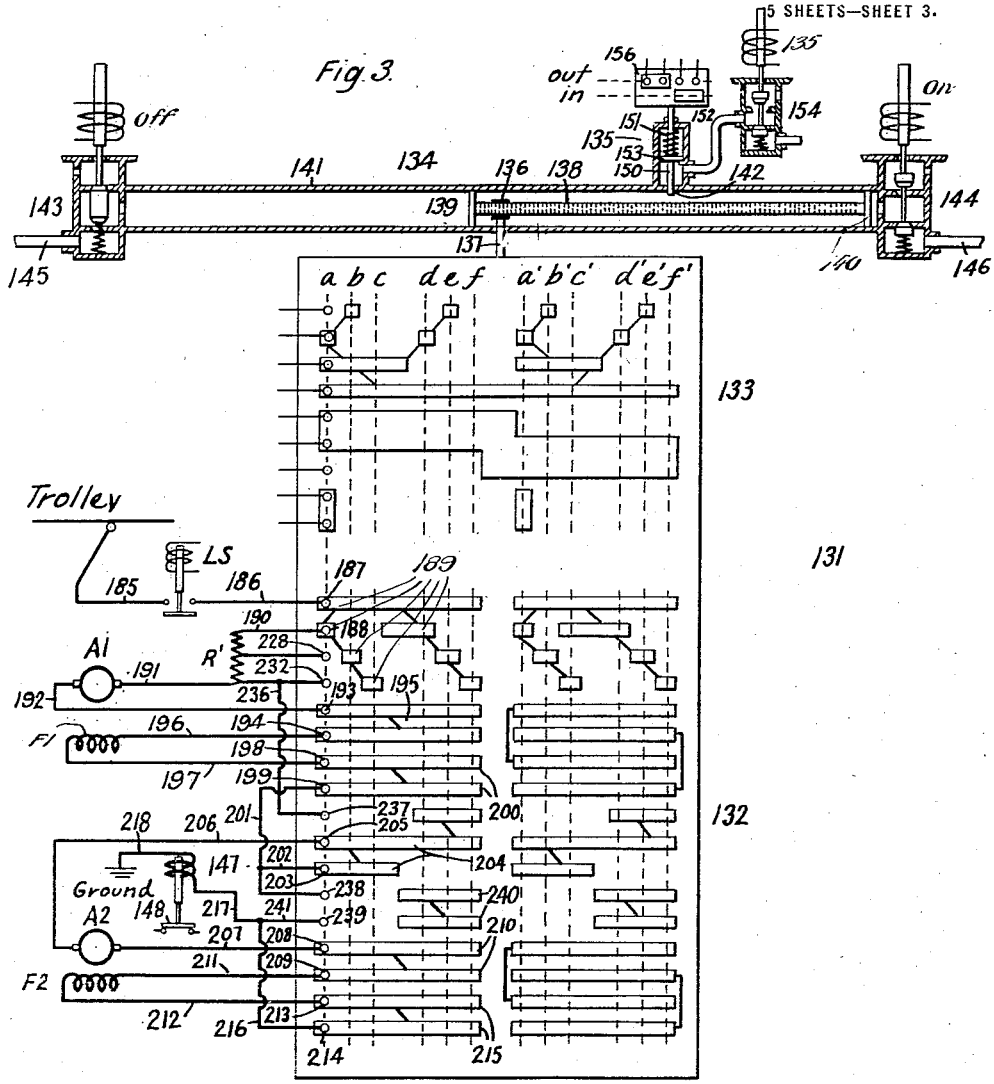
Figure 8:
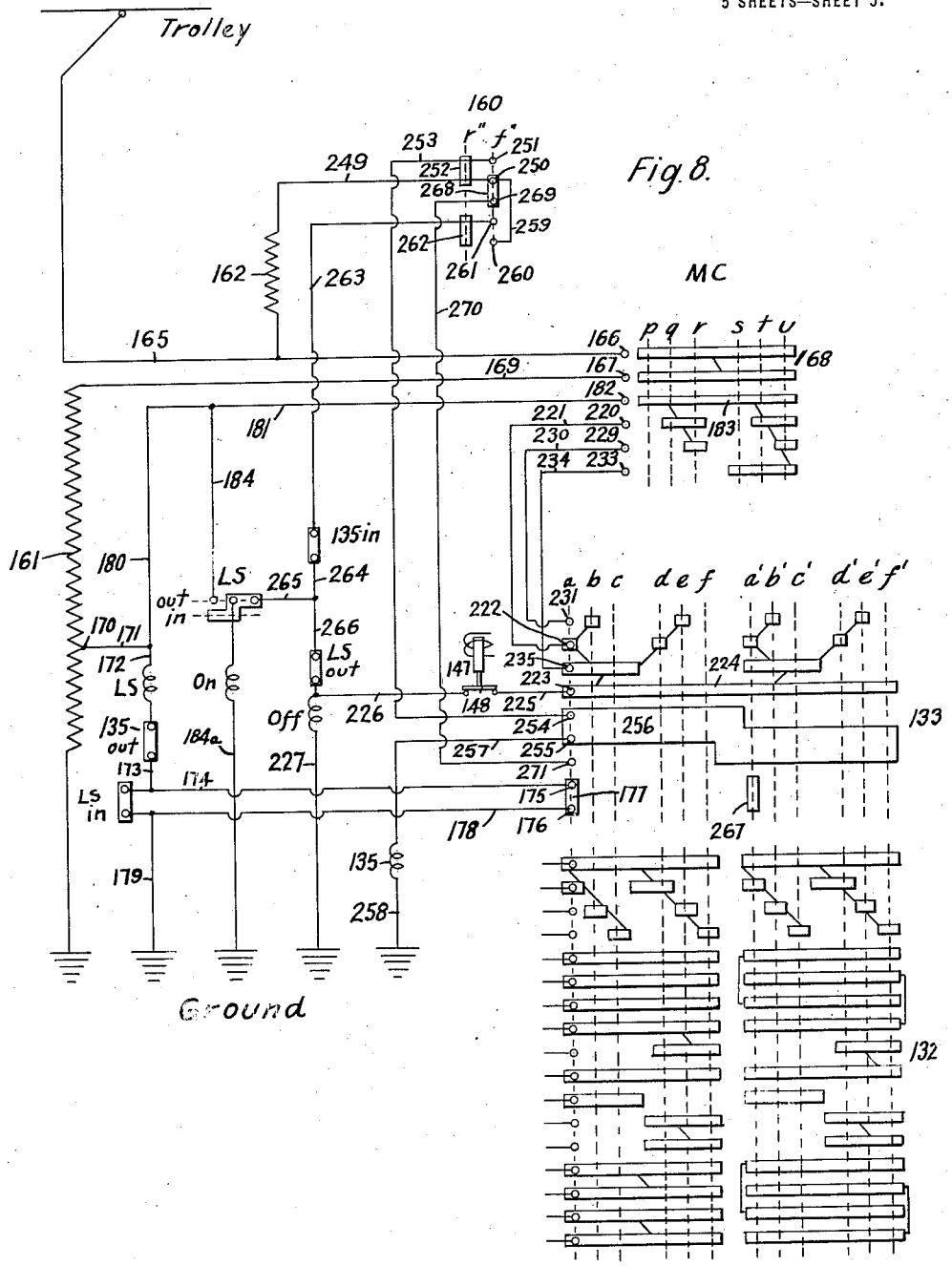

Our invention may best be understood by reference to the accompanying drawings, wherein Figure 1 is a diagrammatic view of a control apparatus for governing the main circuits of a system arranged in accordance with our invention; Fig. 2 is a diagrammatic view of the auxiliary governing circuits for manipulating the apparatus that is shown in Fig. 1; Fig. 3 and Fig. 8 are diagrammatic views, respectively corresponding to Fig. 1 and Fig. 2, of modifications of our invention; and Fig. 4 to Fig. 7, inclusive, are diagrammatic views serving to illustrate the operation of certain control apparatus that is shown in Fig. 3.

Referring to Fig. 1 of the drawing, the system shown comprises a plurality of suitable supply-circuit conductors, respectively marked "Trolley" and "Ground"; an electric motor having an armature A and a field winding F of the well-known series type; a main-circuit variable resistor R; a line switch LS; and a control drum 1 for governing the complete operation of the motor and of the main-circuit resistor.

The control drum 1 embodies a main-circuit controlling portion 2, and an auxiliary or interlocking circuit portion 3 that is connected in circuit as described in connection with Fig. 2. The illustrated control drum is adapted to occupy a normal intermediate or "off" position, a plurality of operative positions $a$ to $d$, inclusive, when actuated in one direction that corresponds to "forward" motor operation, and a plurality of similar positions $a'$ to $d'$, inclusive, when moved in the opposite direction, from the "off" position, that corresponds to reversed running of the motor.

An actuating mechanism 4 for the control drum 1 comprises a pinion member 5 which is rigidly secured to one end of the operating shaft 6 of the control drum and is adapted to normally mesh with the central portion of a suitable horizontally-movable rack member 7 having a notch or recess 8 in the center of its upper face, for a purpose to be described.

A plurality of suitable rods or stems 9 and 10 are rigidly secured to the respective ends of the rack member 7 and a plurality of pistons 11 and 12 are attached to the outer ends of the rods 9 and 10, respectively, to operate within suitable cylinders 13 and 14. A pair of dissimilar valve members 15 and 16 are associated with the respective cylinders 13 and 14 to admit fluid pressure thereto from any suitable source (not shown) through suitable pipes or passages 17 and 18, respectively, in accordance with predetermined conditions to be set forth.

The cylinder 13 also contains a suitable helical spring member 19 that is located between the outer face of the piston 11 and the outer end of the cylinder 13 to return the piston device to the illustrated position under certain subsequently-described conditions. The force exerted by the spring 19 is materially less than the normal fluid-pressure available whereby the spring is easily compressed when fluid-pressure acts upon the piston device in opposition thereto, but the spring will readily overcome the friction of the moving parts and thus return the piston device to the illustrated position when only atmospheric pressure opposes the spring.

The valve member 15 is normally closed to prevent the access of fluid-pressure to the cylinder 13 and to effect communication thereof with the atmosphere, whereas the other valve member 16 is normally open to admit fluid-pressure to the cylinder 14 and thus bias the piston device toward the extreme left position thereof, and is adapted to normally close communication between the cylinder 14 and the atmosphere. A plurality of suitable actuating coils, respectively marked "On" and "Off," are provided for the valve members 15 and 16 and are energized in accordance with the auxiliary governing system of Fig. 2.

The biasing effect of the fluid-pressure that is normally present in the cylinder 14 is arrested in a suitable intermediate position of the rack member 7 by means of an electrically-controlled, automatic locking device 20 that normally engages the notch or recess 8 of the rack member. The locking device 20 comprises a suitable actuating coil 21, which is energized as hereinafter described to actuate a core member 22 to its upper position, wherein a roller 23 that is secured to the lower end of the core member is maintained clear of the rack member in opposition to the action of a suitable spring member 24 that is adapted to bias the roller 23 toward the rack member whenever the actuating coil 21 is deënergized.

The mechanical operation of the actuating mechanism 4 without regard to the electrical connections effected thereby may be set forth as follows: Upon energization of the actuating coils "On" and "Off" and the removal of the locking device 20 from the recess 8, the normal balanced-pressure conditions in the two cylinders 13 and 14 are reversed, that is to say, fluid-pressure is admitted to the cylinder 13 through the now open valve 15 and is exhausted from the cylinder 14 through the now closed valve 16. Consequently, movement of the piston device toward the right from the illustrated position is produced. Such movement may be arrested at any time by merely deënergizing the "off" actuating coil, whereby balanced high fluid-pressure conditions obtain in both cylinders 13 and 14, and a positive and reliable stoppage of the piston device is effected.

To return the actuating mechanism to the illustrated position, the coils "On" and "Off" are simultaneously deënergized, whereby the original unbalanced fluid-pressure conditions obtain in the cylinders 13 and 14, and movement of the piston device toward the left occurs until, the coil 21 having been deënergized, the spring-pressed roller 23 of the locking device 20 drops into the intermediate notch 8 of the rack member 7, thereby preventing further movement.

To effect actuation of the control drum 1 in the opposite direction from its intermediate position "Off," the locking device 20 is raised from the recess 8, through the energization of the actuating coil 21, and movement of the piston device toward the left from the illustrated position is thereby produced, by reason of the normal unbalanced fluid-pressure conditions in the operating cylinders 13 and 14. To arrest such movement at any desired point, the actuating coil "On" may be energized, whereby fluid-pressure is admitted to the cylinder 13, and balanced high fluid-pressure conditions exist upon the outer faces of the pistons 11 and 12 and thus effect the desired stoppage of the actuating mechanism.

To return the piston device to the illustrated position, the "off" coil is energized, whole the "on" coil remains deënergized and, therefore, the helical spring 19 impels the piston device in opposition to the friction of the moving parts only until the locking device 20 again engages the recess 8 of the rack member 7.

Referring now to Fig. 2, the auxiliary governing system shown comprises the supply-circuit conductors Trolley and Ground; a control resistor 29 for supplying suitable low-voltage energy to the various actuating coils; a master controller MC that is adapted to occupy a plurality of operative positions $p$ to $t$, inclusive; a two-position switching device that is adapted to occupy positions $f''$ and $r''$ that respectively correspond to forward and reverse operation of the motor and of the main control drum 1, for operating in conjunction with the master controller MC and the interlocking control drum 3 to govern the actuating mechanism 4; a relay device 31 having auxiliary contact members 32 for aiding the above-mentioned return movement of the piston device from a reversed position; a second relay device 33 having auxiliary contact members 34 for governing the "on" actuating coil during reverse operation of the control drum 1; and an auxiliary resistor 36 that is utilized in connection with the just-mentioned return operation of the actuating mechanism 4.

Assuming that the actuating mechanism 4 occupies the position illustrated in Fig. 1 and that it is desired to effect operation of the motor in the forward direction, the master controller MC may be moved to its initial operative position $p$, whereby a circuit is completed from the trolley through conductors 37 and 38, control fingers 39 and 40 which are bridged by contact segment 41 of the master controller, conductor 42 and control resistor 29 to the negative conductor Ground A further circuit is thereupon completed from an intermediate low-voltage point 43 of the control resistor 29, through conductor 44, the actuating coil of the switch LS, conductor 45, contact member 46—3—"Off" of the auxiliary control drum 3 and conductor 47 to the negative conductor Ground. Upon the closure of the switch LS, a holding circuit therefor is formed by the bridging of the interlock 46 by interlock LS—in, in accordance with a familiar practice.

Another circuit is then completed from the contact segment 41 of the master controller in its position *p*, through control finger 48, conductor 49, control fingers 50 and 51 which are bridged by a suitable contact member of the two-position switching device 30 in its position *f''*, conductor 52, and actuating coil "On", interlock LS—in and conductor 55 to the negative conductor Ground.

Upon the actuation of the master controller to its second operative position *q*, a circuit is completed from the contact segment 41 thereof through control finger 58, conductor 59, control finger 60, contact members 61 and 62 and control finger 63 of the interlock drum 3, conductor 64, control fingers 65 and 66 which are bridged by contact segment 67 of the two-position switching device 30, conductors 68 and 69, the actuating coil "Off", and the previously-mentioned interlock LS—in to the conductor 55.

The actuating coils "On" and "Off" are thus simultaneously energized, but no forward movement of the control drum 1 is possible by reason of the fact that the locking device 20 occupies its normal position.

To allow the desired movement of the actuating mechanism 4, a further auxiliary circuit is completed from the positively-energized conductor 37 through a suitable switch 70, the auxiliary resistor 36, conductors 71 and 72, contact member 72—*q* of the master controller in its position *q*, conductor 73, contact member 73*o* of the auxiliary control drum 3 in its "off" position, conductor 74 and the actuating coil 21 of the locking device 20 to the negative conductor Ground. Thus, the locking device 20 is withdrawn from the rack notch 8 to allow the desired movement of the actuating mechanism. In the other positions of the master controller, the actuating coil 21 is deënergized but such deënergization does not effect the action of the operating device 4, since the roller 23 of the locking device 20 merely rides along the upper surface of the rack member 7.

As the controller drum 1 approaches its initial operative position *a*, the control finger 60 becomes disengaged from the contact segment 61 of the interlock drum 3, thereby deënergizing the "off" actuating coil and effecting the above-mentioned stoppage of the movement of the actuating mechanism 4 by reason of the resulting balanced fluid-pressure conditions therein.

As soon as the main control drum 2 occupies its position *a*, a main circuit (Fig. 1) is completed from the trolley through the closed switch LS, the armature A, conductor 75, control fingers 76 and 77 which are bridged by contact segment 78 of the main control drum 2, conductor 79, field winding F, conductor 80, control fingers 81 and 82 which are bridged by contact segment 83 of the control drum 2, conductor 84, the entire main-circuit resistor R, conductor 85, control fingers 86 and 87 which are bridged by contact segment 88 of the control drum, and conductor 89 to the negative conductor Ground.

To effect further movement of the main control drum in the desired direction, the master controller MC is actuated to its position *r*, whereby a circuit is completed from the contact segment 41 through control finger 90, conductor 91, control finger 92, and contact member 93 of the interlock drum 3, and thence through contact segment 61 to the actuating coil "Off", as previously traced. Such reënergization of the "off" coil effects a movement of the control device 1 to its position *b*, whereupon the contact between the control finger 92 and the segment 93 is broken and thus the actuating mechanism 4 is held in its position that corresponds to the control device position *b*, for the reason previously set forth.

In position *b* of the main control drum 2 (see Fig. 1) the contact segment 83 thereof engages control finger 94, whence circuit is completed through conductor 95 to an intermediate point of the main-circuit resistor R, thus effecting the short circuit of a portion of the resistor to accelerate the motor to a predetermined degree.

Further manipulation of the master controller to its remaining positions *s* and *t* effects a step-by-step movement of the main control drum 2 to its positions *c* and *d*, respectively, whereby the remaining sections of the resistor R are successively short-circuited to connect the motor directly across the supply circuit.

Although we have illustrated a simple main control system in connection with the operation of our apparatus, it will be understood that the specific circuit connections employed are immaterial to the present invention with the exception that, when the control device 1 is moved in one direction, "forward" operation of the motor occurs, whereas actuation of the control device in the opposite direction from the "off" position effects reversed operation of the motor, as about to be described in detail.

Moreover, the two portions of the main control drum 2 could readily be adapted for accelerating and regenerative operation, respectively, in accordance with prior practice, or for other purposes, as will be understood.

Assuming that the master controller MC has been returned to its "off" position and that the actuating mechanism 4, consequently, occupies the position illustrated in Fig. 1, the reversed operation of the main control device and, therefore, of the motor may be effected by first actuating the two-position switching device 30 to its $r''$ position and then moving the master controller MC to its initial operative position $p$.

The circuits of the control resistor 29 and of the actuating coil of the switch LS are thereby completed in a manner previously set forth and in addition, a further circuit is established from the contact segment 41 of the master controller through control finger 48, conductor 49, control fingers 50 and 53 which are bridged by contact member 100 in the position $r''$ of the device 30, conductor 54, the auxiliary contact member 34 of the relay device 33, which at this time occupies its lower or deënergized position, and thence through the actuating coil "On", in accordance with the circuit previously traced.

Upon actuation of the master controller to its position $q$, a circuit is completed from the contact segment 41 through control finger 58 and contact members of the interlock drum 3, as hereinbefore described, to control finger 65 of the two-position switching device 30, whence circuit is completed through contact member 102 and control finger 103 thereof, conductor 104, the actuating coil of the relay device 33 and conductors 105 and 55 to the negative conductor Ground, thereby causing the relay device 33 to occupy its upper or open position to deënergize the "on" coil and thus effect the release of fluid-pressure from the cylinder 13.

In position $q$, the circuit of the actuating coil 21 of the locking device 20 is completed in the same manner as that previously set forth, thereby allowing the reverse movement of the actuating mechanism 4.

Upon the consequent movement of the main control device 1 to its position $a'$, the control finger 60 of the interlock drum 3 becomes disengaged from the contact member 61, thus, deënergizing the relay device 33 which drops to its lower position to reenergize the "on" actuating coil, and thus arrest the movement of the actuating mechanism 4, by reason of the balanced high fluid-pressure conditions therein.

As soon as the main control drum 2 occupies its position $a'$, the main circuit (see Fig. 1) is completed through the armature A in the same direction as before, conductor 75, control finger 76, contact segment 120, conductor 121, contact segment 122 and control finger 81 of the main control drum, conductor 80, the field winding F in the reverse direction from that originally taken, conductor 79, control finger 77, contact segment 123, conductor 124, contact segment 125 and control finger 82, whence circuit is completed as previously described.

Further operation of the control drum in the desired direction is accomplished by moving the master controller to its successive positions $r$, $s$ and $t$, whereby a step-by-step movement of the control device 1 is effected in a manner similar to that already set forth.

To effect the return movement of the actuating mechanism 4 to the illustrated position, the master controller MC is actuated to its "off" position, whereby a circuit is completed from the auxiliary resistor 36 through conductor 71, control fingers 106 and 107 which are bridged by contact segment 108 of the two-position switching device 30 in its position $r''$, conductor 109, control fingers 110 and 111 which are bridged by contact member 112 of the master controller in its "off" position, conductor 113, the actuating coil of the relay device 31 and conductor 114 to the negative conductor Ground, thereby actuating the relay device 31 to its upper or closed position to complete a circuit from the auxiliary resistor 36 through conductors 71 and 115, auxiliary contact members 32 of the relay device, conductor 116, control fingers 117 and 118 which are bridged by contact member 119 of the auxiliary drum 3 in any but its "off" position, conductor 126, the "off" actuating coil, conductor 127 (the line switch LS being open in the "off" position of the controller MC), auxiliary contact members 128 of the relay device 31, and conductor 129 to ground.

Thus the fluid-pressure is exhausted from the cylinder 14, so that atmospheric pressure obtains in both cylinders 13 and 14 of the actuating mechanism 4. Consequently, the force exerted by the helical spring 19 upon the piston 11 is sufficient to move the actuating mechanism to the illustrated position, wherein it is locked by the device 20, as previously described.

Reference may now be had to Fig. 3, wherein the system shown comprises the supply-circuit conductors Trolley and Ground; a plurality of dynamo-electric machines respectively having armatures A1 and A2, and field windings F1 and F2 of the series type; a controlling device 131 of the drum type that embodies a main-circuit section 132 and an auxiliary-circuit section 133; a variable main-circuit resistor R'; an actuating mechanism 134 for the control device 131 that corresponds to the previously-described actuating mechanism 4; a locking device 135 that is associated with the actuating mechanism 134 in a manner to be described; a line switch LS; and a limit switch 147 of a well-known type that is provided with auxiliary-circuit contact members 148.

The actuating mechanism 134 comprises a pinion 136 which is secured to the upper end of the operating shaft 137 of the controlling device 131 and is adapted to mesh with a horizontally movable rack member 138, to the opposite ends of which pistons 139 and 140 are suitably attached to operate within a relatively long cylinder 141. An opening or aperture 142 is provided in the cylinder wall approximately three-quarters of the cylinder length from the left-hand end thereof, as shown in the drawing, for a purpose to be set forth. A pair of valve members 143 and 144 that correspond to the previously-described valve members 15 and 16, are associated with the respective ends of the cylinder 141 to admit fluid pressure thereto under predetermined conditions from a suitable source (not shown) through suitable pipes or passages 145 and 146, respectively.

The locking device 135 comprises a rod or pin 150, that is adapted to normally effect an air-tight engagement with the cylinder aperture 142, by reason of the biasing action of a spring member 151, that may be inclosed within a suitable incasing member or cylinder 152. A piston 153 is adapted to operate within the cylinder 152, in opposition to the action of the spring 151, when the actuating coil of a valve member 154, which is similar to the valve 144, is energized, thus elevating the pin 150 within the aperture 142, for purposes to be described. An interlock board 156 is movable with the stem of the piston 153 and carries a plurality of interlocking contact members that are employed in the auxiliary circuits to be described in connection with Fig. 8.

Since the valve member 143 is normally open to admit fluid pressure to the cylinder 141, whereas the other valve 144 is normally closed to effect communication between the cylinder and the atmosphere, it follows that the pistons 139 and 140 are biased to their extreme right-hand position, whereby the pinion 136 engages the left-hand end of the rack member 138, as shown in the drawing.

The mechanical operation of the actuating mechanism 134 and of the locking device 135 without regard to the specific electrical connections effected thereby, may be briefly described as follows: The "off" position of the actuating mechanism when it is desired to effect immediate "forward" operation of the control device 131, is illustrated in Fig. 3 and in a more simple manner in Fig. 4. Upon energization of the actuating coils "On" and "Off" for the valve members 144 and 143, respectively, the reversal of the normal fluid-pressure conditions in the cylinder 141 causes the pistons 139 and 140 to move toward the left from the illustrated position, whereby the control device 131 successively passes through its "forward" positions $a$ to $f$, inclusive, as subsequently described in detail. However, when the control device 131 reaches its position $f$, the piston 140 strikes the pin 150 of the locking device 135 and further forward movement of the control drum is prevented, as shown in Fig. 5.

To effect movement of the control device 131 to its initial "reverse" position $a'$, the valve member 154 of the locking device 135 is energized to elevate the pin 150 within the cylinder aperture 142 to a position where its lower end is substantially flush with the inner cylinder surface, thus permitting the piston 140 to pass beyond the aperture, whereupon the pin 150 is again lowered within the aperture 142. Thus the escape of fluid-pressure from the cylinder, or admission of fluid-pressure from the valve member 154 thereto, is prevented irrespective of the pin position. Under such conditions, as illustrated in Fig. 6, further movement of the pistons 140 and 139 toward the extreme left-hand position thereof, is permissible to effect the passage of the control device 131 through its successive "reverse" positions $a'$ to $f'$, inclusive. In position $f'$ of the control drum, the pinion 136 engages the right-hand end of the rack member 138, as shown in Fig. 7.

To render the operation of the controlling device 131, particularly with respect to the relative distances traversed, more clear, an element $x$—$y$ of the control drum is shown, in each of Figs. 4 to 7, inclusive, in positions that respectively correspond to the positions $a$, $f$, $a'$ and $f'$ of the control drum.

Referring now to the auxiliary control circuits of Fig. 8, the system shown comprises the supply-circuit conductors "Trolley" and "Ground"; the auxiliary section 133 of the control device 131; the actuating coils of the switching device LS and of the valve members 143 and 144; the auxiliary contact members 148 of the limit switch 147; various interlocking contact members that are associated with the switch LS and with the locking device 135, as illustrated in Fig. 3; a master controller MC that is adapted to occupy a plurality of positions $p$ to $u$, inclusive; a two-position switching device 160 that is adapted to occupy positions $f''$ or $r''$, and which corresponds to the previously-described switching device 30; and a control resistor 161 and an auxiliary resistor 162 that respectively correspond to the resistors 29 and 36 that were described in connection with Fig. 2.

Assuming that the various pieces of control apparatus occupy the respective illustrated positions, acceleration of the motor in the "forward" direction may be effected by actuating the master controller MC to its initial position $p$, whereupon a circuit is completed from the Trolley, through conductor 165, control fingers 166 and 167, which are bridged by contact segment 168 of the master controller; conductor 169 and the control resistor 161 to the negative conductor Ground.

A further circuit is thereupon completed from a suitably low-voltage point 170 of the control resistor 161, through conductors 171 and 172, the actuating coil of the switch LS, interlock 135—out when the locking device occupies its illustrated position, conductors 173 and 174, control fingers 175 and 176, which are bridged by contact segment 177 of the auxiliary control drum 133 in its position $a$ only, and conductors 178 and 179 to the negative conductor Ground. Upon the closure of the switch LS, a holding circuit of a familiar type is formed by the bridging of the conductors 173 and 179, by an interlock LS—in.

A further circuit is completed at this time from the positively energized conductor 171 through conductors 180 and 181 and control finger 182, to contact segment 183 of the master control, whereby the contact segment is energized.

Still another circuit is completed from the conductor 180 through conductor 184, interlock LS—in, the actuating coil "On" of the valve member 144 and conductor 184ª to the negative conductor Ground.

Referring temporarily to Fig. 3, upon the closure of the switch LS, the main circuit is completed from the trolley through conductor 185, the switch LS, conductor 186, the control fingers 187 and 188, which are bridged by contact segment 189 of the control device 131 in its initial position $a$, conductor 190, the entire main-circuit resistor R', conductor 191, armature A1, conductor 192, control fingers 193 and 194, which are bridged by contact segment 195, conductor 196, field winding F1, conductor 197, control fingers 198 and 199, which are bridged by contact segment 200, conductors 201 and 202, control finger 203, contact member 204, control finger 205, conductor 206, armature A2, conductor 207, control fingers 208 and 209, which are bridged by contact segment 210, conductor 211, field winding F2, conductor 212, control fingers 213 and 214, which are bridged by contact segment 215, conductors 216 and 217, the series actuating coil of the limit switch 147, and conductor 218 to the negative conductor Ground. The motors are thus connected in series relation with the resistor R' across the supply circuit.

Referring again to Fig. 8, upon actuation of the master controller to its position $q$, a circuit is established from the contact segment 183 thereof through control finger 220, conductor 221, control fingers 222 and 223, which are bridged by contact segment 224 of the auxiliary control drum 133, conductor 225, auxiliary contact members 148 of the limit switch 147 in its lower position, conductor 226, the actuating coil "Off" of the valve member 143, and conductor 227 to the negative conductor Ground.

Since the actuating coils "On" and "Off" are simultaneously energized, movement of the control device 131 to its second operative position $b$ occurs, whereupon the circuit of the actuating coil "Off" is interrupted by the disengagement of the control finger 222 from the contact segment 224 of the auxiliary drum 133, and the control device 131 is thus held in its position $b$ by reason of the balanced fluid-pressure conditions in the cylinder 141, in accordance with the previously described operation of the actuating mechanism 134.

Since the control device occupies its position $b$ the control finger 228 that is connected to an intermediate point of the main-circuit resistor R' (Fig. 3) engages the contact segment 189 of the main control drum 132, whereby a portion of the resistor R is excluded from circuit, in accordance with familiar practice, to effect a predetermined degree of acceleration of the motor.

When the master controller MC is moved to its next position $r$, a circuit is completed from the contact segment 183 through control finger 229, conductor 230, and control finger 231, which engages contact segment 224 of the auxiliary control drum 133, whereby circuit is continued through the actuating coil "Off" as already traced. The actuating coils "On" and "Off" being thus again energized simultaneously, movement of the control device 131 to its position $c$ ensues, and such movement is arrested in position $c$ by reason of the disengagement of the control finger 231 from the contact segment 224 of the auxiliary drum 133.

In position $c$, the contact segment 189 of the main control drum 132 engages control finger 232 which is connected to one terminal of the main-circuit resistor R', and thus the remaining section of the resistor is excluded from circuit, whereby the motors are connected in full series relation.

Upon actuation of the master controller to its position $s$, a circuit is established from the contact segment 183 thereof, through control finger 233, conductor 234, control finger 235, which engages contact segment 224 of the auxiliary control drum 133 and thence through the "off" actuating coil. The period of energization of the "off" coil is sufficient to effect the movement of the control device 131 to its position $d$, whereupon the circuit of the actuating coil "off" is interrupted in the usual manner.

As the main control drum 132 is actuated toward its position $d$, the engagement of the control finger 232 with contact segment 189 is broken, thereby temporarily re-inserting the resistor R' in circuit, and a new circuit is completed from the control finger 232 through conductor 236, control finger 237 and contact segment 204 to the higher-voltage terminal of the armature A2, whereby the higher-voltage terminals of the armatures A1 and A2 are directly connected.

A further circuit is completed at this time from the conductor 201 through control fingers 238 and 239 which are bridged by contact segment 240 and conductor 241 to the negatively energized conductor 217, whereby the lower-voltage terminal of the machine having the armature A1 is directly connected through the control drum to the lower-voltage terminal of the other machine having the armature A2. Thus the two motors are connected in initial parallel relation, with the resistor R connected in common series-circuit relation with the motors by reason of the reëngagement of the control finger 188 with the contact segment 189.

Actuation of the master controller to its successive remaining positions $t$ and $u$ effects a step-by-step movement of the control device 131 through its positions $e$ and $f$, respectively, whereby the sections of the main-circuit resistor R' are again successively short-circuited and the motors are connected in full parallel relation.

Assuming that the actuating mechanism 134 and control device 131 occupy the respective positions that are illustrated in Fig. 3, the operation thereof to effect reversed running of the motors may be set forth as follows: The two-position switching device 160 is first actuated to its position $r''$, whereupon a circuit is completed from the trolley through conductor 165, auxiliary resistor 162, conductor 249, control fingers 250 and 251, which are bridged by contact segment 252 of the switching device 160, conductor 253, control fingers 254 and 255 which are bridged by contact segment 256 of the auxiliary control drum 133, conductor 257, the actuating coil of the locking device 135, and conductor 258 to the negative conductor Ground.

A further circuit is completed at this time from the control finger 250 of the two-position switching device through conductor 259, control fingers 260 and 261 which are bridged by contact segment 262, conductor 263, interlock 135—in of the locking device, conductor 264, where the circuit divides, one branch including conductor 265, interlock LS—out, the actuating coil "On" and conductor 184ª to the negative conductor Ground, and the other branch including conductor 266, interlock LS—out, the actuating coil "Off", and conductor 227, to the negative conductor Ground. A circuit through both actuating coils "On" and "Off" being thus completed, the control device 131 is actuated to its position $a'$, wherein the circuit of the actuating coil of the locking device 135 is interrupted by the disengagement of control finger 254 and contact segment 256, whereupon the temporarily raised pin 150 of the locking device is again lowered in the cylinder aperture 142, and the actuating mechanism 134 occupies the relative position that is shown in Fig. 6, as previously described.

The circuits of the actuating coils "On" and "Off" are also broken, upon the deënergization of the actuating coil of the locking device, by reason of the exclusion from their energizing circuit of the interlock 135—in. Thus the control device 131 is held in its initial reversed position $a'$.

Upon actuation of the master controller to its initial operative position $p$, the circuit of the control resistor 161 is completed as before, as is also the circuit of the actuating coil of the switch LS with the exception that a contact member 267 that is located in position $a'$ of the auxiliary control drum 133, is substituted for the previously-mentioned contact member 177 that engages the control fingers 175 and 176 in position $a$.

Subsequent movement of the master controller through its remaining positions effects a step-by-step actuation of the control device 131 through its successive "reversed" position $b'$ to $f'$, inclusive, such operation of the auxiliary control drum 133 and of the main control drum 132 being similar to the previously described operation with the exception that the contact segments of the main control drum that correspond to the above-described contact segments 195 and 200, and 210 and 215, are interconnected in a well-known manner to effect a reversed connection of the field windings F1 and F2 with respect to the corresponding armatures, whereby reversed operation of the motors occurs. Since such operation is familiar to those skilled in the art, no further description thereof is believed to be necessary.

Upon the return movement of the master controller to its "off" position, the main controlling device 131 returns as far as its initial "reversed" position $a'$, being held in that position by reason of the presence of the pin 150 of the locking device 135, as illustrated in Fig. 6. Thus, the main control drum 132 is in position to effect immediate successive reversed operations of the motors, as will be desirable when the motors are necessarily reversed during the return trip of the vehicle, as is more or less customary.

However, if the above-mentioned reversal is the only one or the last one that is necessary, then to again place the actuating mechanism 134 in condition to effect "forward" operation of the motors, as illustrated in Fig. 3, the two-position switching device 1;

may be actuated to its position $f''$, whereby a circuit is completed from the positively energized control finger 250 through contact member 268, control finger 269, conductor 270, control fingers 271 and 255, which are bridged by contact segment 256 of the auxiliary control drum, and thence through the actuating coil of the locking device 135, as previously traced. The pin 150 is thus temporarily raised within the cylinder aperture 142 to allow the passage of the piston 140 beyond the aperture and finally to the position that is illustrated in Fig. 3. The locking device 135 again resumes its normal position, when the main control device 131 reaches its position $f$, by reason of the disengagement of the control finger 271 from the contact segment 256 of the auxiliary control drum.

We do not wish to be restricted to the specific structural details or arrangement of parts herein set forth, as various modifications thereof may be effected without departing from the spirit and scope of our invention. We desire, therefore, that only such limitations shall be imposed as are indicated in the appended claims.

We claim as our invention:

1. In a controller, the combination with a movable member having independent operating portions, of actuating means biased toward a predetermined position and having different parts of its range of travel corresponding to said operating portions, and means for normally mechanically locking said actuating means in a different position.

2. The combination with a movable member having independent operating portions, of actuating means comprising a piston device, biasing means for said piston device, a locking device for preventing movement of said piston device under predetermined conditions, and means independent of the biasing means for selectively producing certain unbalanced-pressure conditions upon the piston device to actuate it through different parts of its range of travel that correspond to said operating portions.

3. The combination with a movable member having independent operating portions, of actuating means comprising a piston device normally occupying a predetermined position, valve members for controlling the admission of fluid-pressure to opposite sides of said piston device, a device for locking said member in a position between said portions, an actuating coil for each of said valve-members and for said device, and means for selectively governing said coils to produce movement of said piston device through different parts of its range of travel that correspond to said operating portions.

4. In a controller, the combination with a control drum having independent portions corresponding to "Forward" and "Reverse" operation, of actuating means biased toward a predetermined position and having different parts of its range of travel corresponding to said control drum portions, and means for locking the drum in a position between said portions.

5. The combination with an electric motor, and a control drum having independent portions for completely governing "forward" and "reverse" operation of said motor, of actuating means for the control drum comprising a piston device normally biased toward a predetermined position, valve-members for controlling the admission of fluid-pressure to opposite sides of said piston device, a device for locking said drum in a position intermediate said portions, an actuating coil for each of said valve members and for said device, and means for selectively governing said coils to produce movement of said piston device through different parts of its range of travel that correspond to said control drum portions.

6. The combination with a member to be moved in the one or the other direction from an intermediate position, of electrically-controlled actuating means therefor normally biased toward predetermined positions, a two-position switching device, and means for governing said electrically-controlled means to utilize or reverse the biasing effect in accordance with the position of said switching device.

7. The combination with a member to be moved in the one or the other direction from an intermediate position, of electrically-controlled actuating means therefor pneumatically biased toward predetermined positions, a two-position switching device, and means for governing said electrically controlled means to utilize or reverse the pneumatic biasing effect in accordance with the position of said switching device.

8. The combination with a member to be moved in the one or the other direction from an intermediate position, actuating means therefor comprising a piston member, operating cylinders therefor, a normally open and a normally closed fluid-pressure-controlling valve member associated with the respective ends of said cylinders to bias said piston member toward a predetermined position, means for normally arresting the biasing movement in an intermediate position, and means for relatively manipulating said valve members and said arresting means to effect movement of the movable member in the selected direction from its intermediate position.

9. The combination with a member to be moved in the one or the other direction from an intermediate position, of actuating means therefor comprising a piston member, operating cylinders therefor, a normally open and a normally closed fluid-pressure-controlling valve member associated with the outer ends of said cylinders to bias said piston member toward a predetermined position, an electrically-controlled device for normally and automatically locking the piston member in an intermediate position, electrical actuating coils for said valve members, and means for relatively energizing said coils and said electrically-controlled device to effect movement of the movable member in the selected direction from its intermediate position.

10. The combination with a control drum having independent portions corresponding to different operations, of actuating means therefor comprising a piston member, an operating cylinder therefor, a normally open and a normally closed fluid-pressure-controlling valve member associated with the respective ends of said cylinder to normally bias said piston member toward one extreme position, a locking device for preventing the operation of said piston member under predetermined conditions, and means for relatively manipulating said valve members and said locking device to effect movement of the control drum in accordance with the selected operation thereof.

11. The combination with a control drum having independent portions corresponding to different operations, of actuating means therefor comprising a piston member, an operating cylinder therefor, a normally open and a normally closed fluid-pressure-controlling valve member associated with the respective ends of said cylinder to normally bias said piston member toward one extreme position, an electrically-controlled locking device for preventing the operation of said piston member under predetermined conditions, actuating coils for said valve members, and means for relatively energizing said coils and said electrically-controlled locking device to effect a step-by-step movement of the control drum through the selected operating portion thereof.

12. The combination with a movable member having independent operating portions, of actuating means biased toward a predetermined position and having different parts of its range of travel corresponding to said operating portions, and means independent of the biasing means for normally positively maintaining said actuating means in one position.

13. The combination with a control drum having independent portions corresponding to "forward" and "reverse" operation, of step-by-step actuating means having different parts of its range of travel corresponding to said control drum portions, and means operative in the same direction to control said actuating means during both the forward and reverse operations.

14. The combination with a member movable in several directions, of means for biasing said member in one direction only to produce the selected movment, and different means for intermittently overcoming the force of said bias to interrupt said movement.

15. An operating mechanism comprising a piston device, a normally open valve for admitting fluid to said piston device, a normally closed valve for exhausting fluid from said piston device, electric circuits including actuating coils for said valves, said coils being adapted to be energized to reverse the operation of said valves, means for intermittently actuating one of said coils, and means for rearranging said circuit so as to cause the intermittent actuation of said other coil.

In testimony whereof, we have hereunto subscribed our names this 7th day of Sept., 1916.

KARL A. SIMMON.
SAMUEL B. SCHENCK.

---

It is hereby certified that in Letters Patent No. 1,330,557, granted February 10, 1920, upon the application of Karl A. Simmon, of Edgewood Park, and Samuel B. Schenck, of Wilkinsburg, Pennsylvania, for an improvement in "Systems of Control," an error appears in the printed specification requiring correction as follows: Page 8, lines 43-44, claim 2, strike out the words "independent of the biasing means"; and that the said Letters Patent should be read with this correction therein that the same may conform to the record of the case in the Patent Office.

Signed and sealed this 16th day of March, A. D., 1920.

[SEAL.]

M. H. COULSTON,

*Acting Commissioner of Patents.*

Cl. 172—179.